(12) United States Patent
Seidl

(10) Patent No.: US 7,220,361 B2
(45) Date of Patent: May 22, 2007

(54) TORQUE-LIMITED DRIVE SYSTEM, METHOD, AND APPARATUS FOR A FLUID SCREENING SYSTEM

(75) Inventor: Gerald Seidl, Houston, TX (US)

(73) Assignee: Headworks, Inc., Houston, TX (US)

( * ) Notice: Subject to any disclaimer, the term of this patent is extended or adjusted under 35 U.S.C. 154(b) by 103 days.

(21) Appl. No.: 10/864,712

(22) Filed: Jun. 9, 2004

(65) Prior Publication Data

US 2005/0035049 A1    Feb. 17, 2005

Related U.S. Application Data

(60) Provisional application No. 60/494,292, filed on Aug. 11, 2003.

(51) Int. Cl.
*B01D 29/64* (2006.01)

(52) U.S. Cl. ....................... 210/739; 210/791

(58) Field of Classification Search ................ 210/143, 210/159, 400, 401, 413, 739, 783, 784, 162, 210/767, 791; 209/389; 477/7
See application file for complete search history.

(56) References Cited

U.S. PATENT DOCUMENTS

| | | | | | |
|---|---|---|---|---|---|
| 1,910,860 | A | * | 5/1933 | Sayers | 210/160 |
| 2,240,270 | A | * | 4/1941 | Schaefer | 60/336 |
| 2,525,516 | A | * | 10/1950 | Bergmann et al. | 198/834 |
| 3,018,893 | A | * | 1/1962 | Collie et al. | 210/159 |
| 3,199,793 | A | | 8/1965 | Sabl | |
| 3,659,963 | A | | 5/1972 | Jennings | |
| 4,227,138 | A | | 10/1980 | Espelage et al. | |
| 4,508,318 | A | | 4/1985 | Maeda | |
| 4,799,160 | A | | 1/1989 | Arbeille et al. | |
| 5,032,263 | A | | 7/1991 | Rudzinski | |
| 5,730,862 | A | | 3/1998 | Mahr | |
| 6,129,215 | A | * | 10/2000 | Brauch et al. | 209/379 |
| 6,190,258 | B1 | | 2/2001 | Heidenreich et al. | |
| 2004/0245159 | A1 | * | 12/2004 | Rybar et al. | 210/97 |

FOREIGN PATENT DOCUMENTS

| | | | |
|---|---|---|---|
| DE | 2460355 A | * | 7/1976 |
| DE | 34014954 A1 | | 2/1984 |
| FR | 2808496 A1 | | 5/2000 |
| JP | 03161606 A | * | 7/1991 |
| JP | 05321227 A | * | 12/1993 |

* cited by examiner

*Primary Examiner*—Matthew O. Savage
(74) *Attorney, Agent, or Firm*—Bracewell & Giuliani LLP

(57) ABSTRACT

A drive system for driving a screen in a fluid screening system comprises an electric gear motor equipped with a mechanical torque limited coupling. The system is sized to provide the torque required to drive the screen throughout the desired speed range, as well as providing additional torque as required to free lodged solids from the screen field. The mechanical torque limited coupling provides overload protection when lodged solids block the rotating rake bar. The coupling operates up to a predetermined torque value before the overload protection is activated. The drive system may be operated in either a manual mode or an automatic mode.

13 Claims, 8 Drawing Sheets

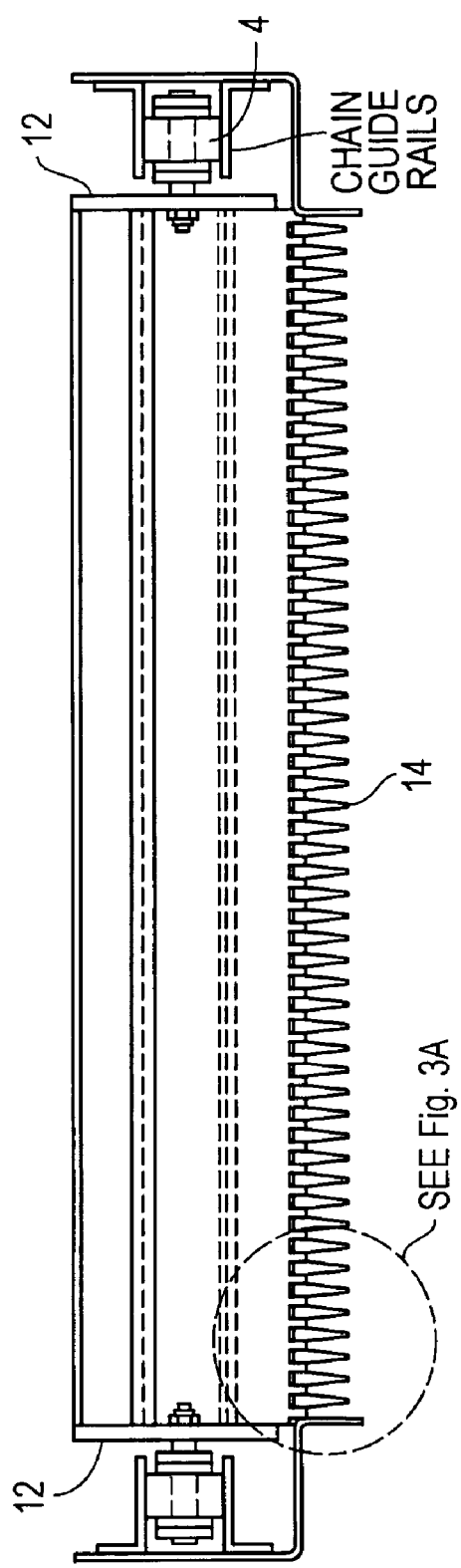
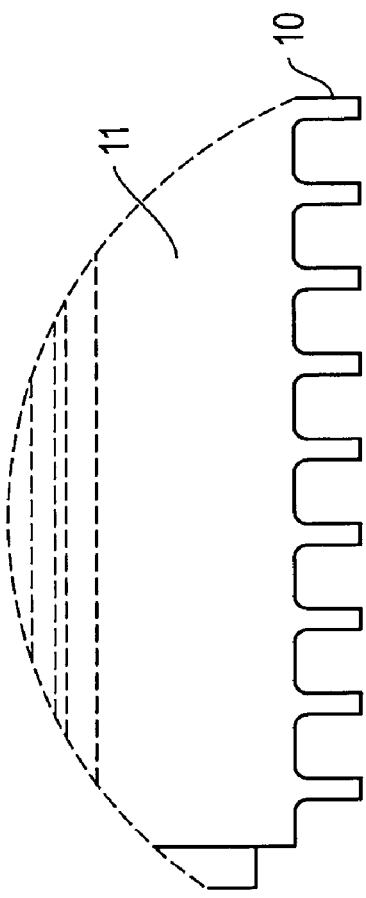
FIG. 3
FIG. 3A

TORQUE-LIMITED DRIVE SYSTEM, METHOD, AND APPARATUS FOR A FLUID SCREENING SYSTEM

This patent application claims priority to U.S. Provisional Patent Application No. 60/494,292, filed on Aug. 11, 2003, which is incorporated herein by reference.

BACKGROUND OF THE INVENTION

1. Technical Field

The present invention relates in general to an improved drive system in a fluid screening operation and, in particular, to an improved system, method, and apparatus for mechanically driving a fluid screening system as well as sensing and correcting an overload in the fluid screening system.

2. Background of the Invention

Bar screens are used for screening solids and debris from flowing liquid streams. An example of such a bar screen system can be found in U.S. Pat. No. 5,730,862. In such systems, a series of rakes pass over parallel screen bars, which make up a bar screen field and remove the debris collected from the flowing stream. Occasionally, large pieces of debris can clog and even damage the bar screen field by either bending or breaking one or more bars within the bar screen field. Furthermore, such blockage can cause the fluid to overflow the filter system. When damage does occur, the screen system must be repaired by typically cutting out the affected bars and welding new bars in their place. These repairs are time consuming, potentially hazardous, and expensive. The screen system is typically taken out of service for a relatively long period of time in order to make such repairs, which also adds significantly to the costs of the repairs.

Some prior art systems have tried to address this problem by using nozzles to spray the debris off of the rakes and screen, or either reversing the direction of travel for the rakes until the impediment has been removed from the screen. However, these attempts are not always successful at clearing the screen enough to continue operation of the system, especially when the debris is relatively large size. Thus, a need exists for an improved screen system, and preferably one that can prevent or avoid such extensive damage and repairs. Ideally, such a system should be capable of being adapted to the specific fluid applications and also be able to be used on existing screen system equipment with minimal modification.

SUMMARY OF THE INVENTION

One embodiment of a drive system for driving a screen in a fluid screening system comprises an electric gear motor equipped with a mechanical torque limited coupling. The coupling comprises an adapter with a torque limiting coupling. The coupling is installed between the output shaft of the motor and the input shaft of the gear box. The mechanical torque limited gear motor drive system is sized to provide the torque required to drive the rake assembly throughout the desired speed range, as well as providing additional torque as required to free lodged solids from the screen field. It is the mechanical torque limited coupling that provides the overload protection required when the lodged solids block the rotating rake bar. The coupling operates up to a predetermined torque value before the overload protection is activated.

Torque is transmitted through the coupling by frictional force applied to a driven disc by the action of two cup springs and an adjusting pressure nut. When the drive system encounters torque that exceeds the predetermined torque value, the coupling halves slip relative to each other. When this slippage occurs, a pulse counting proximity sensor that is monitoring the driven half of the coupling begins to produce fewer pulses. This "pulse train" is compared to a second pulse train that is generated by a second proximity sensor that is monitoring the motor half of the coupling. When the controller detects a difference in these two pulse trains (indicating slippage), it will close a relay contact and stop the rake assembly.

The drive system may be operated in either a manual mode or an automatic mode. In the manual operation mode, the drive system operates in forward or reverse when power is supplied. The drive system can be operated at a low speed or a high speed operating mode. The screen rotates in the selected direction at the selected speed. When the rake assembly encounters an obstruction that causes an applied torque that is greater than the torque limited coupling allows, the drive system stops. This condition must be manually acknowledged or reset at the screen control panel. After resetting and clearing the obstruction, the drive system can be restarted.

In the automatic operating mode, the drive system runs forward at a selected speed mode in response to a respective level input received at the rake assembly control panel. The drive system will continue to run at the selected speed until such time as a different level input is received. Selection of the other level input causes the drive system to shift to the other speed operating mode. The high speed operating mode may be accomplished either by energizing a second set of windings in the two-speed motor or by selecting the higher preset run speed in the variable frequency drive. The drive system runs in the high speed mode until the high level input is removed, at which time it slows to the low speed mode until that input is also removed. The rake assembly operates for a brief time to clear the solids remaining on the rakes, and then shut down. If the input level is not selected during an operator adjustable time period, the rake assembly automatically runs for an adjustable time period to exercise the system.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

FIG. 3 is a partial, top plan view of a rake assembly of the present invention;

FIG. 3A is an enlarged view of a portion of the rake assembly;

DETAILED DESCRIPTION OF THE INVENTION

U.S. Pat. No. 5,730,862, assigned to Headworks, Inc., is incorporated herein by reference.

Figure 2:
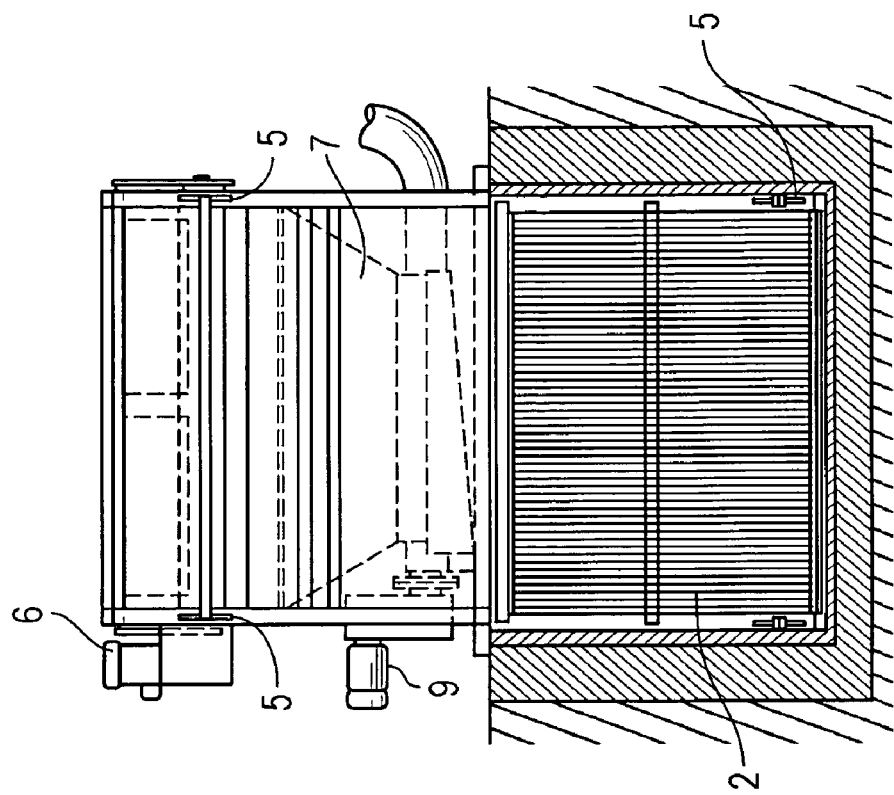
FIG. 2 is a front elevational view thereof.
Figure 1:
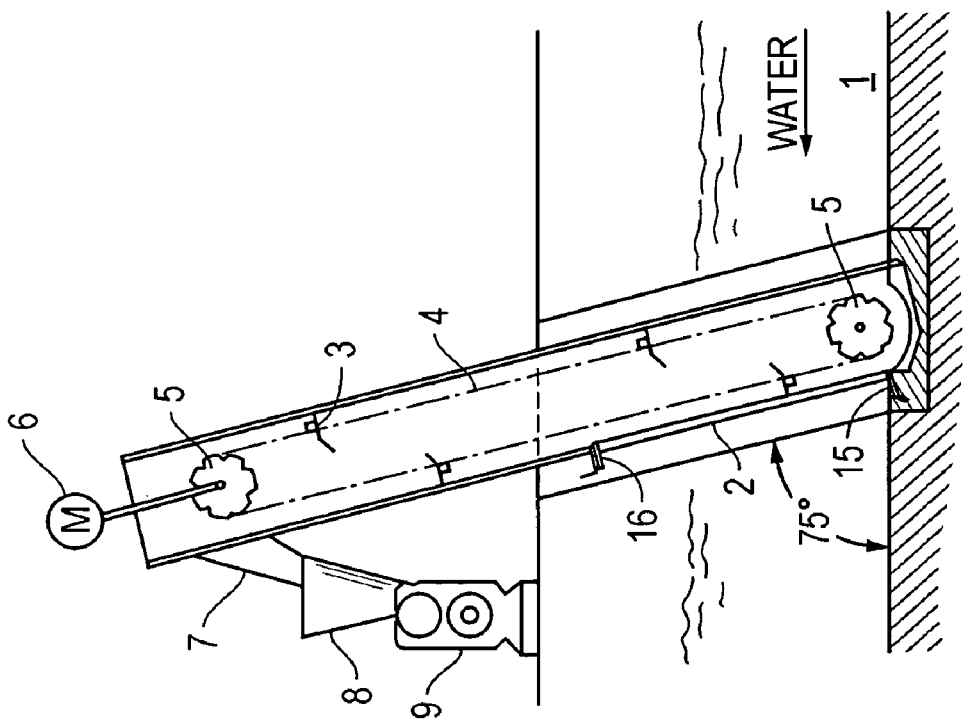
FIG. 1 is a schematic, side elevational view of the rake assembly constructed in accordance with the present invention.

Referring now to all of the figures and particularly to FIG. 1, a water channel 1 is shown in which water flows in the direction of the arrow. Solids are collected at a screen 2 and the screenings are raked upwardly from the screen with a plurality of rakes 3. The screen 2 makes an angle of approximately 15 degrees with respect to a vertical line. The rakes 3 are disposed on an endless chain 4 that travels about sprocket wheels 5, which rotate in a clockwise direction. The upper sprocket wheel 5 is driven by a drive system 6, which will be described below in greater detail. The screenings that are raked from the screen 2 are lifted upwardly by a respective rake 3. When the rake 3 reaches a scraper mechanism (FIG. 8), the screenings are brushed from the rake 3 and fall through chutes 7, 8 into a screenings bale press 9. The bale press 9 (e.g., a screw press or a snail press) is used for dewatering the screenings and for reducing the volume of the collected material.

Figure 4:
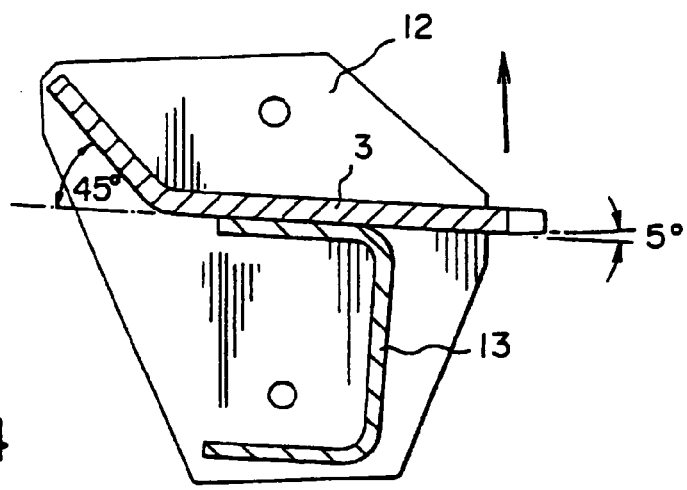
FIG. 4 is a side elevational view thereof.

Referring now to FIG. 3, the rake 3 has a multiplicity of tines 10 that are formed directly from a rake plate 11. Depending on the spacing of the screen 2, the tines 10 have a typical width of between 4 mm and 8 mm. These small measurements make it virtually impossible to attach tines to the rake plate 11 and still obtain the necessary accuracy and rigidity. Accordingly, the tines 10 of this invention are laser or plasma-machined from the rake plate 11, with a plasma cutter, a water cutter, or still other means. Either side of the rake 3 is attached to the side walls or rake cheeks 12. The chain 4 travels in chain guide rails. In order to obtain the required accuracy, the chain 4 should be a precision transport chain. As shown in FIG. 4, the rake plate 11 is profiled such that it forms an upward bend of about 45 degrees. A U-rail 13 is provided at the back of the rake plate 11, as seen in the rake travel direction (to the right in FIG. 3). The U-rail 13 is welded to the rake plate 11.

Figure 5:
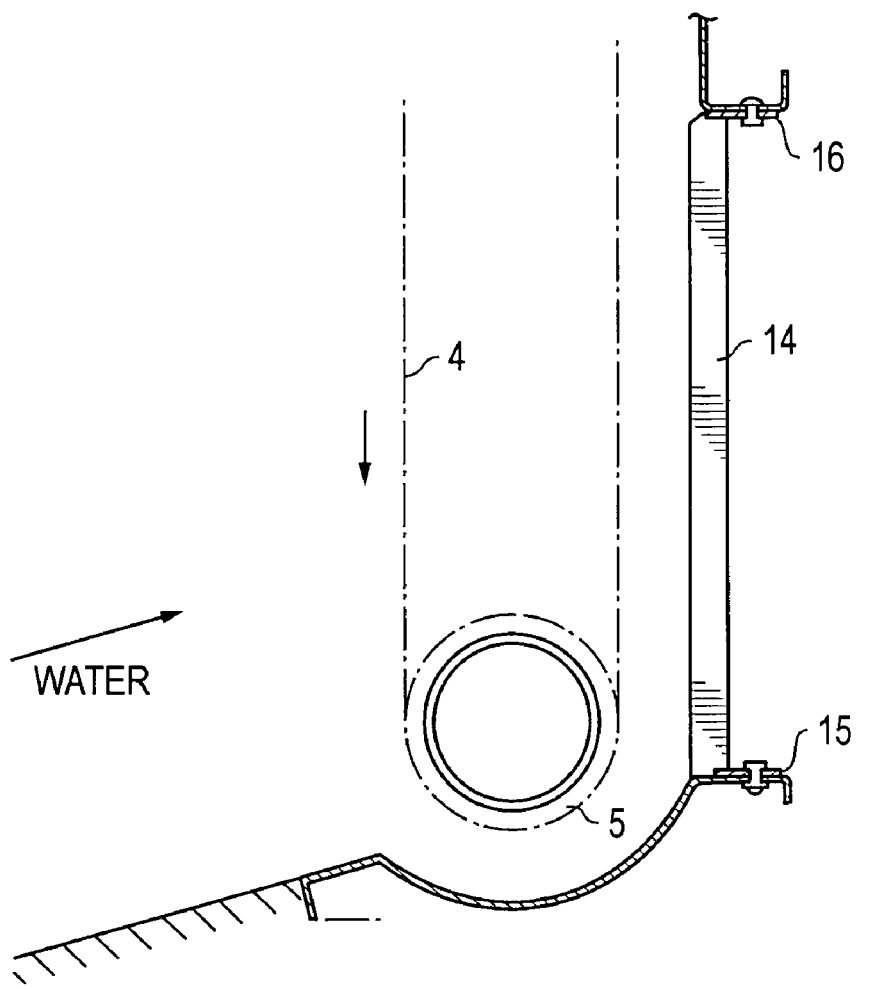
FIG. 5 is a side elevational view of a bottom portion of the rake assembly.
Figure 6:
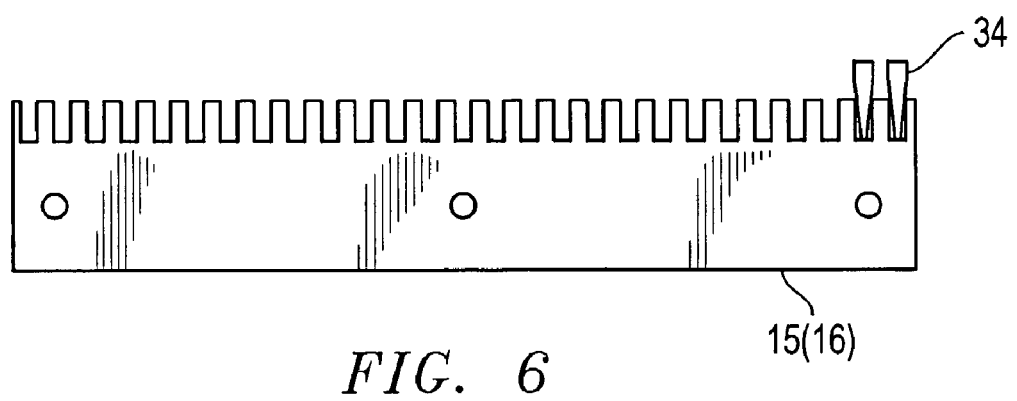
FIG. 6 is a top plan view of a holding plate for the vertical screen bars.
Figure 7:
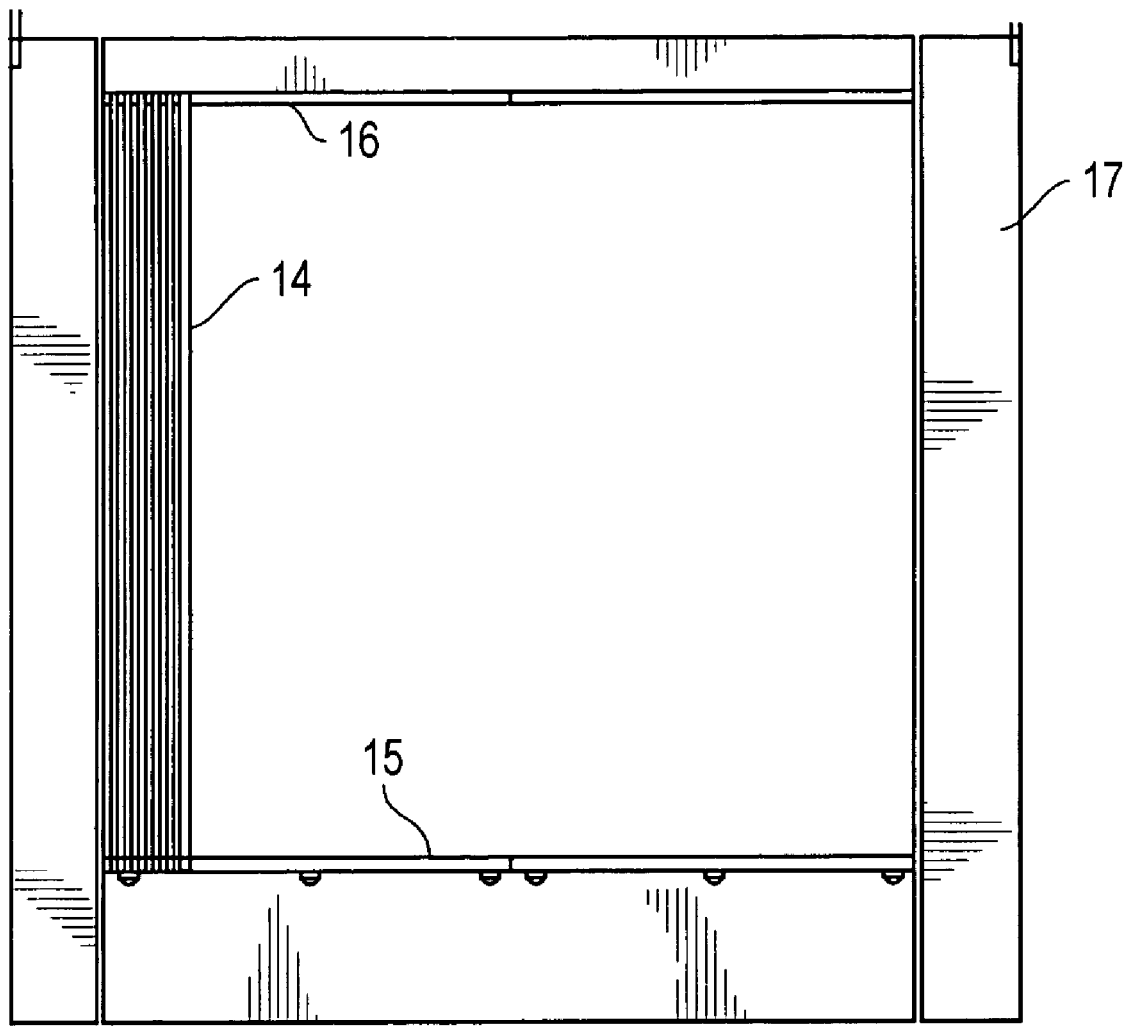
FIG. 7 is a front elevational view of the screen, illustrating only a few screen bars.

Referring now to FIGS. 5–7, the screen 2 comprises a multiplicity of vertical screen bars 14. The cross-section of the screen bars 14 may be, for example, trapezoidal, forming a leading edge that is approximately twice the width of the trailing edge, with reference to the water flow direction. Alternatively, the screen bars 14 may be provided with rectangular or still other cross-sectional shapes as well, such as a teardrop shape. The screen bars 14 are welded to a sole plate or bottom plate 15 and into an upper screening retention plate or top plate 16. The bottom and top plates are bolted to a screen frame 17. Depending on the width of the water channel, it is possible use several screen modules, which are formed by the plates 15, 16 and the screen bars 14. If the channel depth exceeds a given material limit with regard to the free length of the screen bars 14, it is possible to add horizontal reinforcement bars extending between the plates 15, 16.

As indicated by the downward arrow in FIG. 5, the chain 4 travels about the lower sprocket wheel 5 in a counterclockwise direction. The travel speeds are approximately 0.11 m/s minimum speed, and 0.22 m/s maximum speed. The drive system 6 is preferably a 3-phase motor. The gear box, such as a helical worm gear unit may be used.

Figure 8:
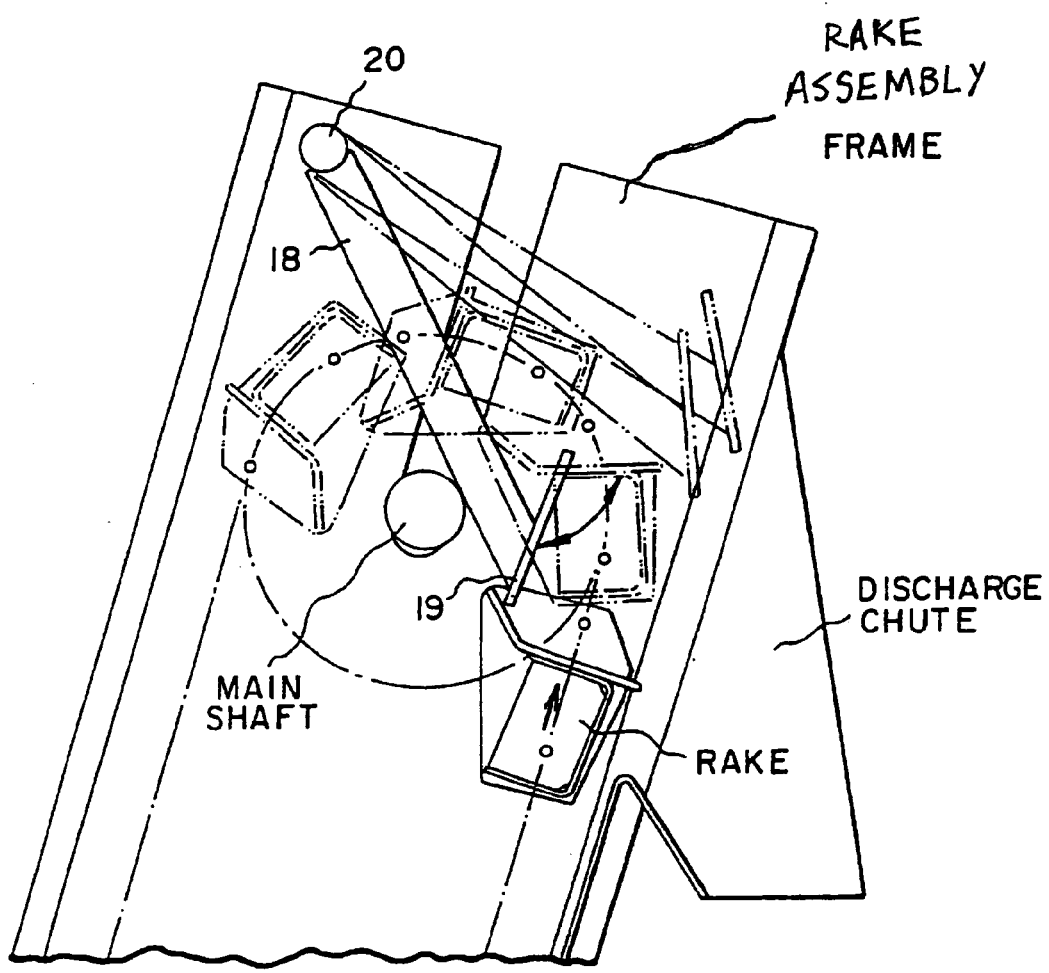
FIG. 8 is a diagrammatic side view of the top portion of the rake assembly, showing the scraper mechanism.

Referring now to FIG. 8, when the rake 3 reaches the height of the discharge chute 7, the screenings are scraped from the rake 3 by means of a scraper mechanism. The scraper mechanism comprises a pendulum arm 18 and a plunger plate 19. The pendulum arm 18 swivels freely in a bearing 20. By way of example, the frame 17 is preferably formed entirely from a 4 mm thick plate and is recessed to accommodate the scraping mechanism, chain guides and idler sprockets in order to maintain the full channel width through the plane of the screen.

The frame is accurately set into position into the necessary recesses in the channel walls and it is grouted securely into place. No fixing bolts are used. The screen may be set, for example, at 75 degrees relative to horizontal. The screen may be set at other angles as well. The frame is fully welded to the sole plate, the screen plane, and to the rear screenings retention plate. It is also fully welded to the head plate, the discharge chute, and the closure plate between the underside of the discharge chute and the top of the channel. At the upstream face of the screen assembly, box section cross members are securely welded to the side members or the frame at regular intervals between a point above the maximum top water level and the head of the screen. These cross members form the supports for non-illustrated removable transparent cover panels.

The upper section of the frame incorporates the screening's washwater spray bar and the necessary shrouding to eliminate the aerosol effect of the washwater system. In one embodiment, the bars are selected by the bar spacing from three different sizes. In another embodiment, the bars are approximately 25 mm deep and 5 mm thick for screens for water depths up to about 1500 mm. For water depths in excess of about 1500 mm, the screen bars are approximately 40 mm deep and 8 mm thick. In both cases the bars have a tapered cross section as illustrated. The bars extend from the sole plate, to which they may be individually welded or otherwise joined, such as with bolts and clips, to a point that is approximately 200 mm above maximum possible top water level. At that point they are individually joined or welded, for example, to the upper screening retention plate.

Intermediate stiffening supports are welded to the screen bars as necessary for screens to accommodate water depths in excess of about 2000 mm. These stiffening bars are of rectangular cross sections and they are oriented so as to present the minimum cross-sectional area against the flow in the channel. The screen bars shall be individually welded to each stiffening support. The bottom plate is profiled to induce screenings and debris in the lower level of the flow to be directed onto the lower portion of the screen bars and no to be accumulated at the foot of the screen. The leading edge of the sole plate is at the same level as the channel floor.

Raking bars and tines are formed from single continuous bars of sufficient stiffness across the full width of the bar. The bar has a minimum thickness of 8 mm and has tines of the appropriate profile to suit the screen bar spacings milled from the leading edge of the same. The raking bar tines penetrate to within 3 mm of the root of the screen bars and leaving a gap of 7 mm between the leading edge of the screen bars and to root of the raking tines. The tines form an angle of 5 degrees to the normal to the screen bars while engaged with the same, with the ends of the tines trailing the remainder of the raking bar. The raking bars are attached to the drive chains within the side members of the screen frame utilizing suitably fabricated links. The raking bars are accurately aligned to ensure that for the full width of each bar the tines penetrate the screen bars to the correct amount of the full extent of travel of the tines while engaged within the screen bars.

Stainless steel or polypropylene chain guides are securely fixed to the side members of the screen frame for the full height of travel of the chains. The guides are designed to ensure that the majority of the chains are kept out of contact with the main flow as far as possible, while giving sufficient clearance for the connecting links for each raking bar.

Idler sprockets are located at the lower end of each side member of the screen frame and have a minimum thickness of about 20 mm. A bush housing is contiguously welded on both faces to the sprocket. The sprockets are retained on their stub axles by a suitable, easily removable mechanism to ensure ease of replacement of the bearing if necessary. Alternatively, a turn-around guide may be used at the bottom of the assembly instead of sprockets. The turn-around guide may be formed from steel, plastic (e.g., HDPE), or other suitable materials. The drive shaft at the head of the screen frame has two chain sprockets mounted thereon generally as described above, but they are securely keyed to the shaft. The bearing for the shaft within the screen frame may be, for example, self-lubricating polypropylene. The bearing between the drive unit and the screen frame is a conventional roller ball-race type. The raking mechanism is designed to ensure that any part of the screen is cleaned at least once every five seconds.

The drive unit is suitably continuously rated and is selected to match the duty of the particular screen. The drive unit is directly coupled to the rake assembly drive shaft through the gearbox. A facility is incorporated within the drive mechanism mounting arrangement to enable the scraping mechanism drive chains to be correctly tensioned and the raking bars to be accurately positioned across the screen face. Such adjustments are possible without the dismantling of any part of the screen frame and without the necessity for any special tools.

A current sensing overload device with a built-in intelligent control facility is incorporated within the rake assembly starter compartment in the motor control center. The device is capable of reverse the direction of travel of the scraping mechanism, should a blockage occur on the screen and cause the overload device to trip the normal operation of the screen rake. The device is also capable of enabling this reversing action to be affected for a maximum of, for example, five times for any one occurrence. Further, the device either resets automatically if the blockage causing the initial overload conditions is cleared, or, should the blockage remain upon the completion of the fifth attempt at automatic clearance of the same, the alarm is generated.

The scraper bar is fabricated and mounted so that it efficiently cleans the full width of each raking bar. The bearing for the scraper bar is self-lubricating polypropylene. For screens which are wider than about 2000 mm, the damping effect of the bearings are insufficient to permit the scraper bar to return to its rest position in a smooth, steady motion without inducing any shock into the mechanism and a purpose-made and efficient hydraulic damping unit is affixed to either end of the scraper bar shaft to ensure that the returning scraper bar does not suddenly drop back into its rest position.

The assembly may further incorporate a washwater spray bar in the head of the screen to aid the cleaning of the scraper bar/raking bar interaction and also to ensure that the maximum amount of organic material is returned to the main flow of sewage. The spray bar spans the full width of the screen and has individual nozzle jets set into its at least 150 mm centers. The jets produce a wide angle of spray in the same plane as that in which the spray bar lies and is aligned to maximize the washing of the screenings as they are scraped off each raking bar. Washwater is delivered to the spray bar at a pressure of 16 bar and at the rate of 21/min/nozzle. A solenoid valve is fitted to the washwater line feeding the spray bar to ensure that the flow to the screen is isolated when the screen is not being operated. The washwater system should operate continuously during the operation of the screen. A complete shroud may be fitted to the screen head to ensure that the aerosol effect of the spraying system is adequately contained. The discharge chute is set to guide all the screening removed by the screen as efficiently as possible into the screening handling system. The chutes form an integral part of the screen assembly and also forms part of the washwater shrouding system.

Figure 9:
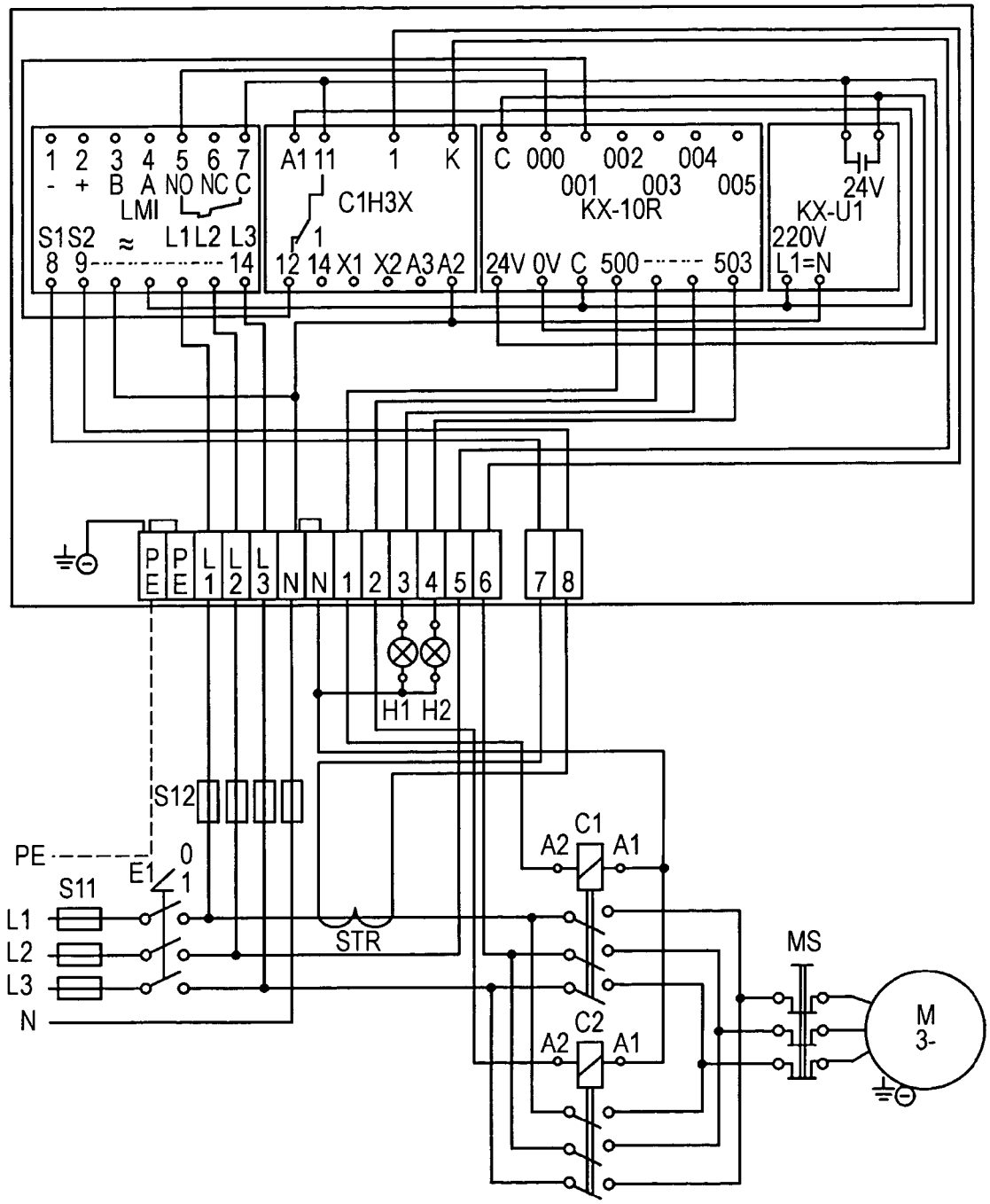
FIG. 9 is a circuit diagram showing one embodiment of an overload control system for the rake assembly.
Figure 10:
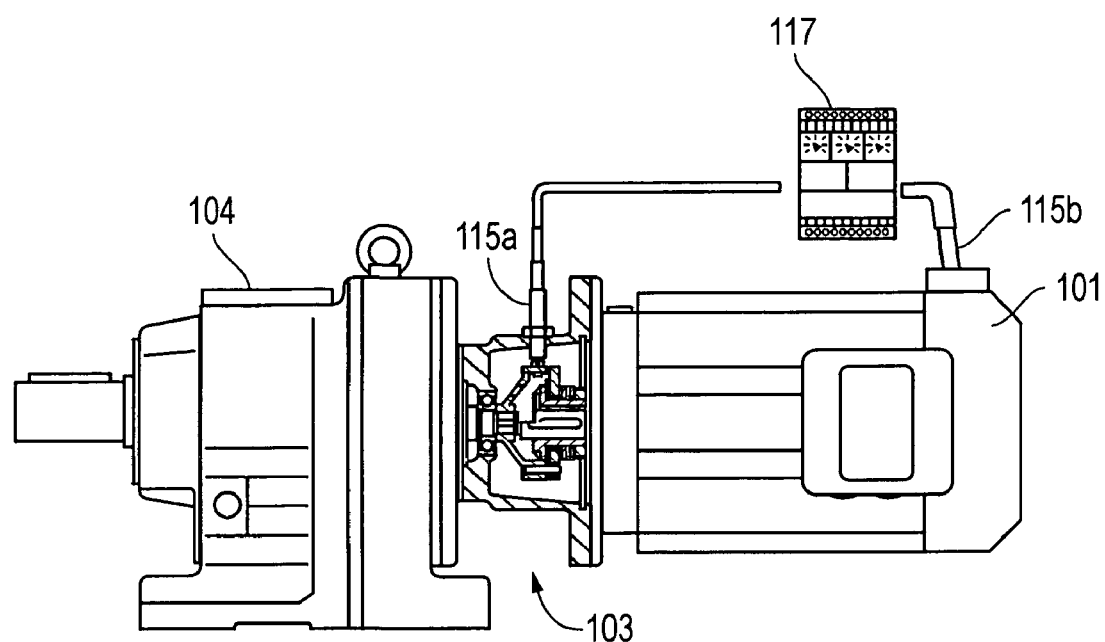
FIG. 10 is a schematic sectional view of one embodiment of a torque limiting coupling for a fluid screening system and is constructed in accordance with the present invention.
Figure 11:
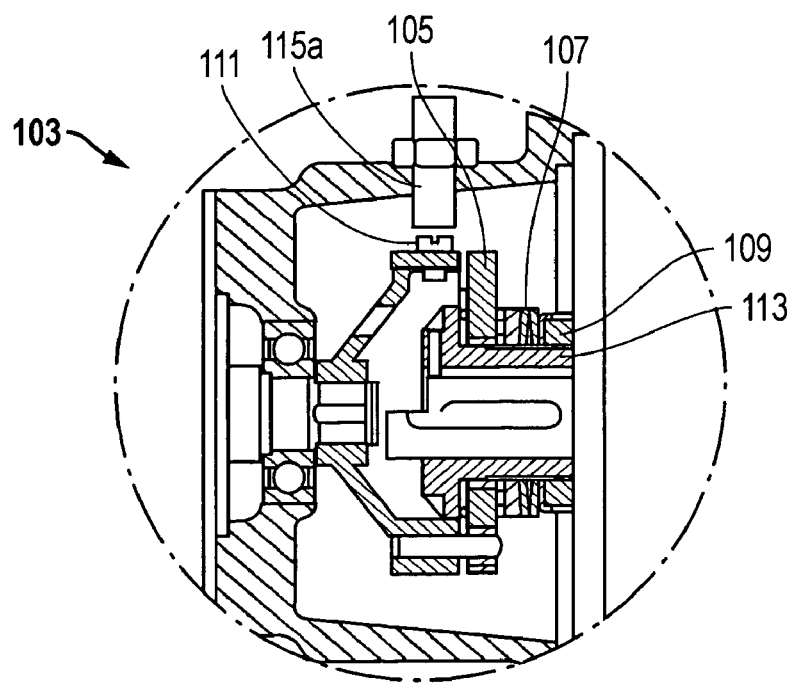
FIG. 11 is an enlarged sectional view of an interior portion of the torque limiting coupling of FIG. 10.

Referring now to FIG. 9, one embodiment of the overload control device, mentioned above, is described. The reference characters outside the main box are as follows: E1 is a main switch; S1 are main fuses; S2 are component input fuses; STR is a transformer; H1 is an indicator light showing operation; H2 is an indicator light showing an error; MS is a motor protector; C1 and C2 refer to protectors for the voltages of forward and reverse operation, respectively. C1 and C2 must be mechanically coupled to one another. The control device may be, for example, microprocessor controlled. In an alternate embodiment, PLC and VFD devices are utilized, or relay logic to accomplish the control goals and allow the sensors to interface with the logic in the control panel.

Referring now to FIGS. 1 and 10–12, one embodiment of the drive system 6 for driving the rake assembly comprises an electric gear motor 101 equipped with a mechanical torque limited coupling 103. The coupling 103 may comprise, for example, an adapter with a torque limiting coupling. The coupling 103 is installed between the output shaft of motor 101 and the input shaft of the gear box 104. The motor 101 is installed on the screen 2 using a shaft-mounted approach. In one embodiment, the motor 101 is supplied with power either through a two-speed, reversing motor starter arrangement, in which case the motor 101 is a two-speed type, or by a variable frequency drive that requires only an inverter duty motor.

The mechanical torque limited gear motor drive system 6 is sized to provide the torque required to drive the rake assembly throughout the desired speed range. The drive system 6 is also capable of providing additional torque as required to free lodged solids from the screen field. It is the mechanical torque limited coupling 103 that provides the overload protection required when the lodged solids block the rotating rake bar. The coupling 103 operates up to a predetermined torque value before the overload protection is activated.

Torque is transmitted through coupling 103 by frictional force applied to a driven disc 105 (FIG. 11) by the action of two cup springs 107 and an adjusting pressure nut 109. When the drive system 6 encounters torque that exceeds the predetermined torque value, the coupling halves 111, 113 slip relative to each other. When this slippage occurs, a pulse counting proximity sensor 115a that is monitoring the driven half of the coupling 103 begins to produce fewer pulses. This "pulse train" is compared (in a speed monitoring controller 117) to a second pulse train that is generated by a second proximity sensor 115b (FIG. 10) that is monitoring the motor half of the coupling. The second sensor 115b is provided for two-speed and infinitely variable speed operation. When the controller 117 detects a difference in these two pulse trains (indicating slippage), it will close a relay contact and stop the screen 2. Alternatively, when the actual torque increases above the predetermined torque value, the controller 117 gives a relay output that is used to stop the screen 2.

Figure 12:
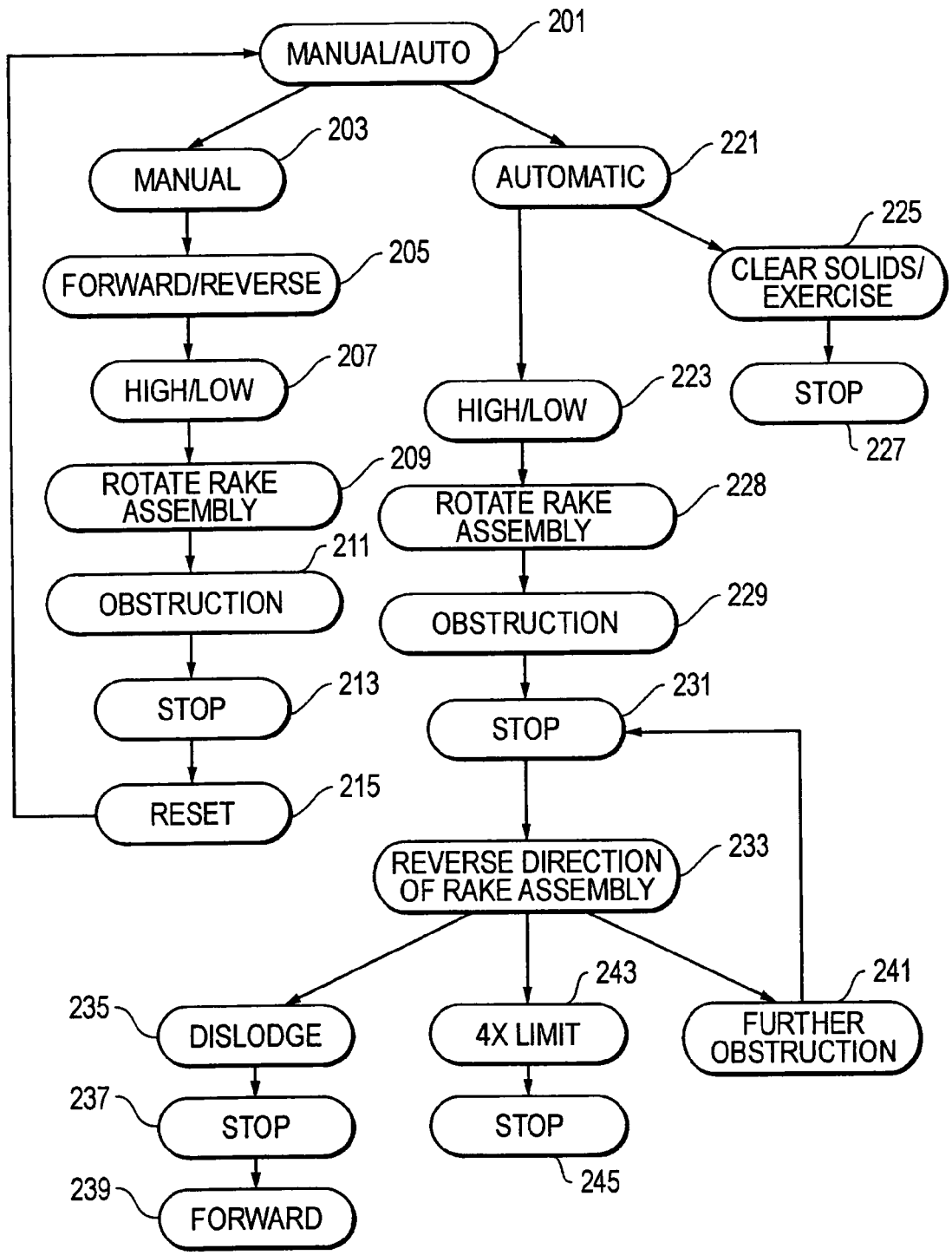
FIG. 12 is a flowchart of one embodiment of a method in accordance with the present invention.

In operation, the drive system 6 may be operated in either a manual mode or an automatic mode, as selected at an overall rake assembly control panel, as depicted at step 201 (FIG. 12). In the manual operation mode 203, the drive system 6 operates in forward or reverse (step 205) when power is supplied. The drive system 6 can be operated at a low (normal) speed or a high speed operating mode, as depicted at step 207. The rake assembly then rotates (step 209) in the selected direction at the selected speed. In the event that the rake assembly encounters an obstruction (step 211) that causes an applied torque that is greater than the torque limited coupling 103 allows, the drive system 6 stops immediately, as illustrated at step 213. In the manual operation mode, this condition must be manually acknowledged or reset (step 215) at the screen control panel by depressing a reset button. After resetting and clearing the obstruction, the drive system 6 can be restarted, as shown at step 201.

In the automatic operating mode (step 221), the drive system 6 runs forward at a selected speed mode (step 223) in response to a respective level input received at the screen control panel. In one embodiment, the drive system 6 will continue to run at the selected speed until such time as a different level input is received. Selection of the other level input causes the drive system 6 to shift to the other speed operating mode. The high speed operating mode may be accomplished, for example, either by energizing a second set of windings in the two-speed motor 101 or, alternately, by selecting the higher preset run speed in the variable frequency drive. In one embodiment, the drive system 6 will run in the high speed mode until the high level input is removed, at which time it slows to the low speed mode until that input is also removed. With no input (step 225), the screen 2 will operate for a brief time (i.e., adjustable off delay) to clear the solids remaining on the rakes, and then shut down (step 227). If the input level is not selected during an operator adjustable time period (also step 225), the screen 2 will automatically start and run for an adjustable time period to exercise the system.

During operation (step 228), an obstruction on the rake assembly may be encountered (step 229) while operating in either the high or low speed mode. The obstruction leads to excessive torque requirements, which stops the rake assembly (step 231), as described above. After an adjustable delay, the screen begins rotating in reverse (step 233) in the low speed mode. Rotation continues for an adjustable time period to allow the rake bar to fully sweep the rake assembly field to remove the solid(s) that caused the jam to occur. If the obstruction dislodges easily (i.e., no excessive torque occurs) when the reversing rake makes contact (step 235), then, after an adjustable time period, the rake assembly stops (step 237) and then runs forward again (step 239). However, if the obstruction does not dislodge easily and obstructs the reverse motion of the screen to cause excessive torque (step 241), the screen stops once again (step 231). After the adjustable time period, the rake assembly begins rotating back in the forward direction (step 233) in the appropriate speed mode. These forward/reverse cycles continue until, in one embodiment, four attempts (e.g., four excessive torque conditions) have been made to clear the obstruction. On the fifth attempt (step 243), the drive system shuts down immediately (step 245). More or fewer attempts may be performed, depending on the application.

The present invention has several advantages. The drive system uses a mechanical torque limited coupling to provide the torque required to drive the rake assembly throughout the desired speed range, as well as providing additional torque as required to free lodged solids from the rake assembly field. The mechanical torque limited coupling provides overload protection when the lodged solids block the rotating rake bar. The coupling operates up to a predetermined torque value before the overload protection is activated. Another advantage is that the drive system may be operated in either a manual mode or an automatic mode.

While the invention has been shown or described in only some of its forms, it should be apparent to those skilled in the art that it is not so limited, but is susceptible to various changes without departing from the scope of the invention. For example, the present invention may employ a clutch-based system for accomplishing the same purpose and function. In addition, the motor may be controlled with a reversing motor starter instead of the variable frequency drive. Current may be monitored using a current sensing relay. The control system may use high current input in the same way that the "current attained" output from the variable frequency drive is used.

The system also may be varied by substituting a power monitor for the system using current monitoring. A power monitor that senses changes in motor power output (phase relationships in the voltage feed to the motor) may be substituted to give a "high power used" input to the controller. A motion sensing approach may be used to determine the machine has been stopped or is being overloaded. This system would use a controller similar to the one used with the torque limited coupling. The rotational speed of the system may be monitored using a proximity sensor that outputs pulses. The controller looks for a pulse count that remains in a preprogrammed range. If the machine slows or is stopped, the controller provides a contact closure to the control system that would be the same as the standard "current attained" input. Furthermore, motion sensing may be used on the rakes themselves but would expose the electronics to the atmosphere more than the approach above. If the rake fails to pass in a preset time period then the machine has been overloaded. The proximity sensor pulse train drop described above is instantaneous.

I claim:

1. A method of driving a screen rake assembly with a drive system in a fluid screening system, comprising:
   (a) selecting a direction for driving the screen rake assembly;
   (b) selecting a speed of operation for the screen rake assembly;
   (c) moving the screen rake assembly in the selected direction at the selected speed;
   (d) upon encountering an obstruction with the screen rake assembly, causing an applied torque that is greater than a mechanical torque that a mechanical torque limited coupling of the drive system will allow thereby causing slippage of said coupling;

(e) sensing slippage of said coupling; and (f) stopping the drive system when slippage in said coupling is sensed.

2. The method of claim 1, further comprising, after stopping the drive system and after a delay, operating the screen rake assembly in an opposite direction a time period to remove the obstruction.

3. The method of claim 2, wherein, if no excessive torque is encountered while dislodging the obstruction by moving the rake assembly in the opposite direction, then, after the time period of operation in the reverse direction, stopping the screen rake assembly and running the screen rake assembly in an original direction.

4. The method of claim 2, wherein, if excessive torque is encountered while attempting to dislodge the obstruction by moving the rake assembly in the opposite direction, stopping the screen rake assembly once again and, moving the rake assembly in an original direction.

5. The method of claim 4, further comprising the steps of:

(a) repeating reversal of the direction of the screen rake assembly for several iterations to clear the obstruction;

(b) after a selected maximum number of reversals, failing to clear the obstruction; and, (c) shutting down the drive system.

6. The method of claim 1, further comprising:

(a) manually resetting the drive system;

(b) clearing the obstruction; and (c) manually restarting the drive system.

7. A method of driving a rake assembly in a fluid screening system, the method comprising the steps of:

(a) connecting a motor to a mechanical torque limited coupling and connecting the coupling to the rake assembly;

(b) supplying power to the motor;

(c) with a pulse counting proximity sensing apparatus, providing pulses which are proportional to a speed of the rake assembly and a speed of the motor used to drive the rake assembly;

(d) comparing the pulses;

(e) utilizing the comparison to determine a slippage of the coupling, which indicates an obstruction of the rake assembly; and (f) if slippage is detected, stopping the motor.

8. The method of claim 7, further comprising a step of clearing the obstruction by reversing a direction of the rake assembly.

9. The method of claim 8, wherein the step of clearing the obstruction is achieved through at least one forward and reverse cycle of the rake assembly.

10. The method of claim 9, further comprising adjusting a number of the forward and reverse cycles that will be performed by the rake assembly.

11. The method of claim 10, further comprising:

(a) performing the forward and reverse cycles for a time period to clear the obstruction;

(b) failing to clear the obstruction; and (c) then shutting down the drive system.

12. The method of claim 10, wherein the reverse cycle is done in a low speed mode.

13. The method of claim 7, further comprising:

(a) manually resetting the motor;

(b) clearing the obstruction; and (c) manually restarting the motor.

* * * * *